United States Patent
Pearson

(10) Patent No.: US 11,518,466 B2
(45) Date of Patent: Dec. 6, 2022

(54) STORAGE DEVICES

(71) Applicant: ALPEN STORAGE, INC., Charlottesville, VA (US)

(72) Inventor: Eric Pearson, Charlottesville, VA (US)

(73) Assignee: ALPEN STORAGE, INC., Charlottesville, VA (US)

( * ) Notice: Subject to any disclaimer, the term of this patent is extended or adjusted under 35 U.S.C. 154(b) by 307 days.

(21) Appl. No.: 16/070,335

(22) PCT Filed: Jan. 16, 2017

(86) PCT No.: PCT/US2017/013679
§ 371 (c)(1),
(2) Date: Jul. 16, 2018

(87) PCT Pub. No.: WO2017/124076
PCT Pub. Date: Jul. 20, 2017

(65) Prior Publication Data
US 2019/0016404 A1 Jan. 17, 2019

Related U.S. Application Data

(60) Provisional application No. 62/357,311, filed on Jun. 30, 2016, provisional application No. 62/279,754, filed on Jan. 16, 2016.

(51) Int. Cl.
*B65D 85/68* (2006.01)
*B62J 19/00* (2006.01)
(Continued)

(52) U.S. Cl.
CPC ............. *B62J 19/00* (2013.01); *A45C 11/00* (2013.01); *A45C 13/02* (2013.01); *B62H 3/02* (2013.01);
(Continued)

(58) Field of Classification Search
CPC .. B62J 19/00; B62J 23/00; E04H 6/04; B65D 85/68; B65D 2585/6862
(Continued)

(56) References Cited

U.S. PATENT DOCUMENTS 613,773 A * 11/1898 Neumann ............... B62B 13/18
280/5.22
629,049 A 7/1899 Streat
(Continued)

FOREIGN PATENT DOCUMENTS

| CA | 2377749 A1 | 9/2003 | |
| DE | 4310487 A1 * | 6/1994 | ............... E04H 6/04 |
| DE | 4310487 A1 | 10/1994 | |

*Primary Examiner* — Javier A Pagan
(74) *Attorney, Agent, or Firm* — Andrew F. Young; Nolte Lackenbach Siegel

(57) ABSTRACT

This invention relates to storage devices, particularly to storage devices for storing and protecting vehicles, and more particularly to storage devices for storing and protecting bicycles and/or motorcycles. In one aspect of the present invention, a storage device may include an enclosure which may be sealed and/or closed off to the outside environment, and may further include a compact, at least partially nesting structure. In an exemplary embodiment, the nesting structure may include a plurality of segments that may form the enclosure, where some of the segments may nest into another to open the enclosure while maintaining the compact form-factor of the structure.

16 Claims, 7 Drawing Sheets

(51) Int. Cl.
*B62H 3/08* (2006.01)
*A45C 11/00* (2006.01)
*A45C 13/02* (2006.01)
*B62H 3/02* (2006.01)
*E04H 6/00* (2006.01)

(52) U.S. Cl.
CPC ............... *B62H 3/08* (2013.01); *B65D 85/68* (2013.01); *E04H 6/005* (2013.01); *B65D 2585/6862* (2013.01); *B65D 2585/6865* (2013.01)

(58) Field of Classification Search
USPC .......................................................... 206/335
See application file for complete search history.

(56) References Cited

U.S. PATENT DOCUMENTS

| | | | | |
|---|---|---|---|---|
| 2,728,115 A * | 12/1955 | Cornelius | ............. | E04B 1/3448 160/39 |
| 3,762,569 A * | 10/1973 | Spring | .................... | G07F 17/10 211/5 |
| 3,865,245 A * | 2/1975 | Lieb | ......................... | B62H 3/10 211/5 |
| 4,306,390 A * | 12/1981 | Brown | ................... | A63G 25/00 52/DIG. 14 |
| 5,507,121 A * | 4/1996 | Taylor | ..................... | E04H 6/005 52/72 |
| 5,625,982 A * | 5/1997 | Foote | .................... | E04B 1/3211 52/64 |
| 6,052,951 A * | 4/2000 | Daoud | .................. | E04B 1/3448 52/64 |
| 7,464,900 B2 * | 12/2008 | Clark | ........................ | B64G 1/56 89/36.01 |
| 7,475,700 B2 * | 1/2009 | Pollard | .................... | E04H 15/38 135/132 |
| 7,694,830 B1 * | 4/2010 | Larson | ..................... | B62H 3/08 211/20 |
| 8,397,440 B1 * | 3/2013 | Ceballos | .................. | E04H 15/38 135/132 |
| 8,820,004 B1 * | 9/2014 | Jeffords | .................... | B62H 3/04 52/DIG. 14 |
| 9,022,265 B2 * | 5/2015 | Wolfe | ..................... | B60P 3/077 224/403 |
| 9,920,547 B1 * | 3/2018 | Greenblatt | .............. | E04H 6/005 |
| 10,688,939 B2 * | 6/2020 | Settelmayer | .............. | B60R 9/10 |
| 2003/0192262 A1 * | 10/2003 | Delavega | .................. | E04H 6/04 52/66 |
| 2005/0102917 A1 * | 5/2005 | Kofler | ...................... | B62J 19/00 52/79.1 |
| 2007/0107322 A1 * | 5/2007 | Blume | ..................... | B62H 3/12 52/79.4 |
| 2013/0001908 A1 | 1/2013 | Karppinen | | |

\* cited by examiner

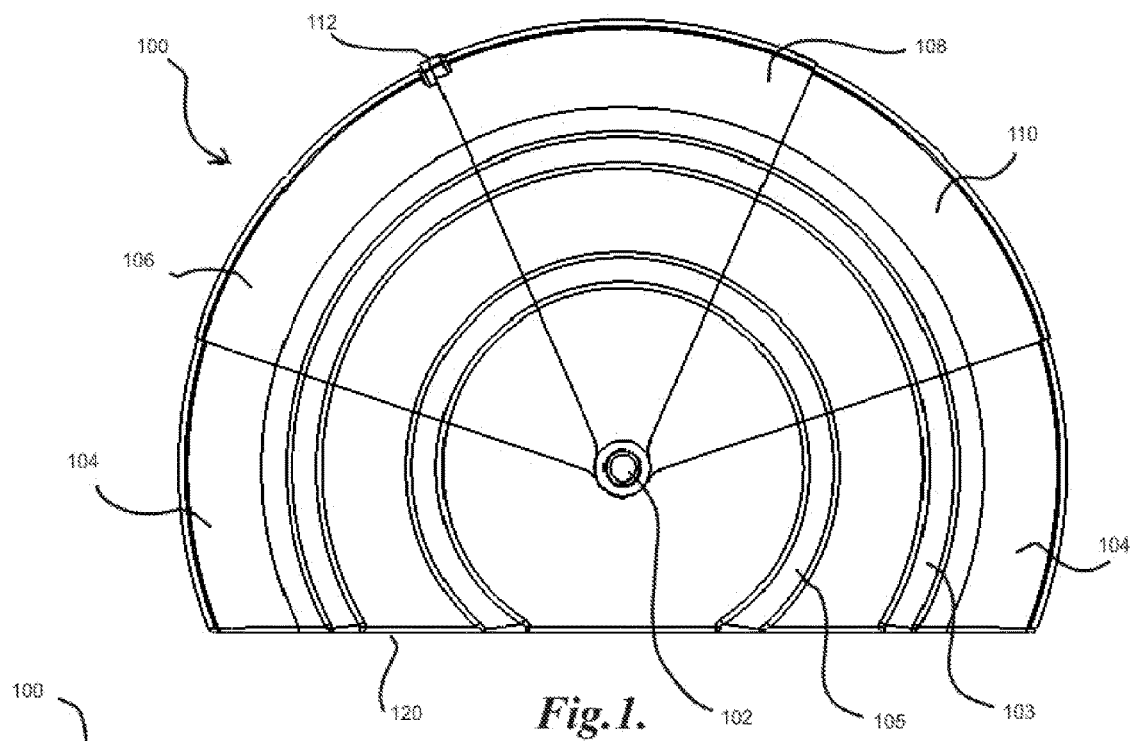
*Fig.1.*
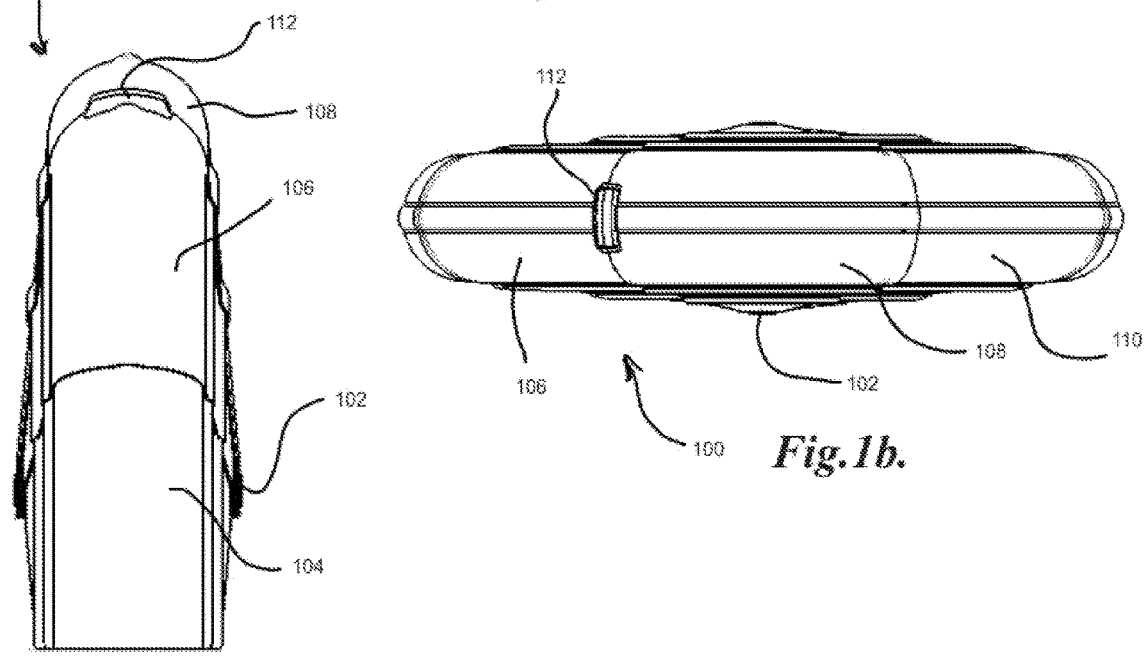
*Fig.1a.*  *Fig.1b.*

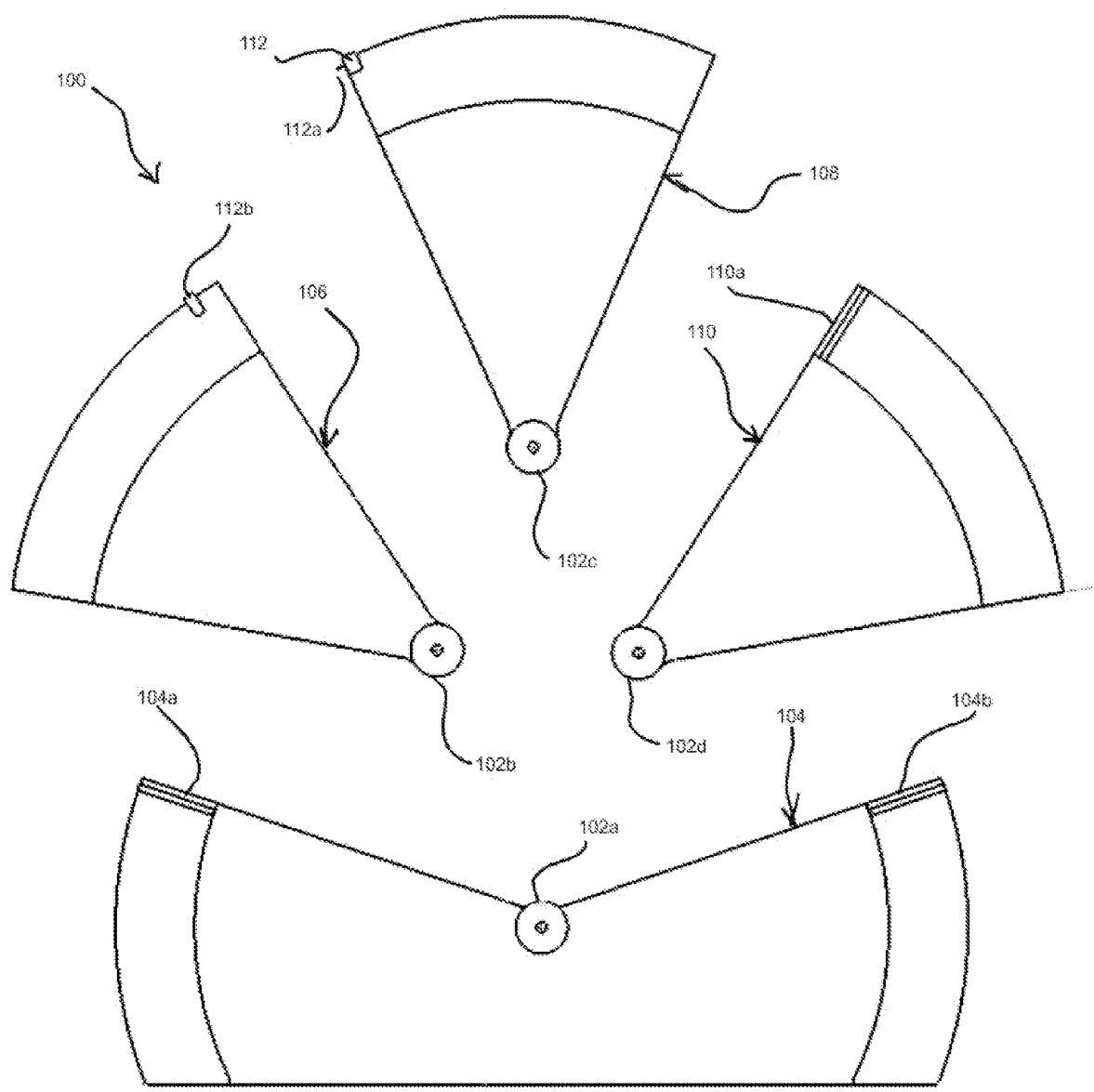
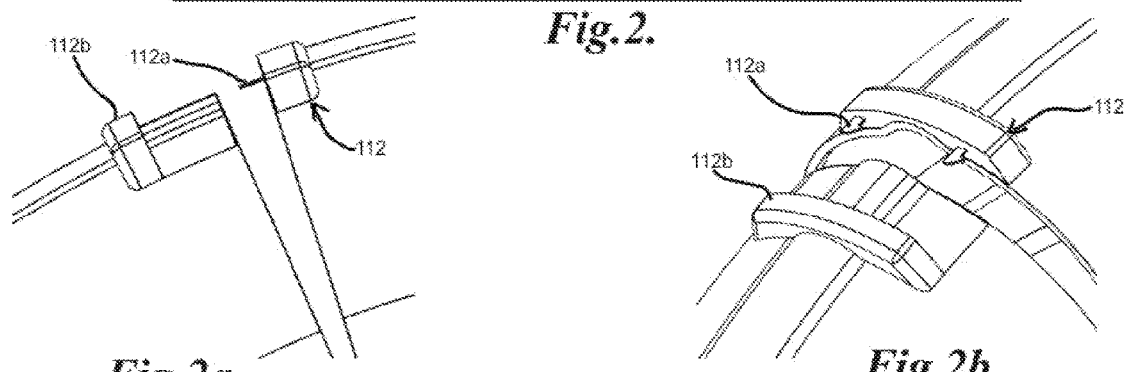
Fig.2.
Fig.2a.
Fig.2b.

STORAGE DEVICES

CROSS-REFERENCE TO RELATED APPLICATIONS

This application is a 371 national phase application of Patent Cooperation Treaty international application Ser. No. PCT/US17/013679, filed Jan. 16, 2017, entitled "STORAGE DEVICES", which claims the benefit and priority of U.S. provisional patent application Ser. No. 62/279,754, filed Jan. 16, 2016, entitled "STORAGE DEVICES", and Ser. No. 62/357,311, filed Jun. 30, 2016, entitled "STORAGE DEVICES", the contents of all of which are hereby incorporated by reference in their entireties.

FIELD OF THE INVENTION

This invention relates to storage devices, particularly to storage devices for storing and protecting vehicles, and more particularly to storage devices for storing and protecting bicycles and/or motorcycles.

BACKGROUND OF THE INVENTION

Bicycles and motorcycles require proper storage and protection to prevent deterioration of components due to exposure to the elements and to deter theft. Many individuals can store these vehicles in garages or storage structures, but many others do not possess these options. Moreover, even in such structures, there may not be adequate protection and the vehicles may get in the way, be unsightly or may be subject to damage from cars or other objects.

SUMMARY OF THE INVENTION

This invention relates to storage devices, particularly to storage devices for storing and protecting vehicles, and more particularly to storage devices for storing and protecting bicycles and/or motorcycles.

In one aspect of the present invention, a storage device may include an enclosure which may be sealed and/or closed off to the outside environment, and may further include a compact, at least partially nesting structure. In an exemplary embodiment, the nesting structure may include a plurality of segments that may form the enclosure, where some of the segments may nest into another to open the enclosure while maintaining the compact form-factor of the structure.

The storage device may generally be constructed from any appropriate material, but may generally include rigid and/or durable materials to provide integrity and protection to the contents. Appropriate materials may include, but are not limited to, metals and alloys, composite materials, polymeric materials, naturally-derived materials such as wood, and/or any other appropriate material or combination thereof. The structure of the storage device may also include, for example, structural reinforcements or supports. These may be desirable to, for example, increase rigidity, increase durability and/or strength, provide guides or tracks for moving components, and/or other benefits.

In some embodiments, the nesting structure may generally have the form of a half circle or arch, where the flat portion of the structure may rest on the ground or other surface. The structure may also include stabilizing and/or supporting features or structures, such as feet and/or cross-stabilizers. The stabilizing and/or supporting features or structures may also be movable, such as for retracting during non-use.

In some embodiments, the nesting structure may include a plurality of segments which may rotate and/or pivot on a central common axis or pivot point.

In exemplary embodiments, a locking and/or secure closure may also be included for security of the contents of the storage device, as well as, for example, aiding in closing off the interior of the storage device from the outside.

The segments may further include stops and/or other features for controlling the extent of movement and/or articulation of the segments to, for example, prevent the segments from moving beyond their intended positioning.

In another aspect of the present invention, a storage device may further include wheel holders and/or other features for retaining a wheeled vehicle, such as, for example, a road bicycle, a mountain bicycle, a triathlon/time trial bicycle, a motorcycle, a recumbent bicycle, a hybrid bicycle and/or any other common wheeled vehicle, in a desired orientation and position within the storage device. For example, wheel tracks or holders, frame holders, bumpers, cushioning and/or any other appropriate feature or combination thereof may be utilized to hold a wheeled vehicle within the storage device. In general, it may be desirable to employ adjustable and/or flexible features to accommodate a variety of different vehicles, sizes or variations.

In a further aspect of the present invention, a storage device may also include features for aiding or assisting a user in inserting and/or removing a wheeled vehicle from the storage device. In some embodiments, the storage device may include an aperture or opening at ground level such that a wheeled vehicle may be rolled into and/or out of the storage device without lifting. In some other embodiments, the storage device may include an assist feature, such as a ramp, incline, ledge or other graduating feature such that a wheeled vehicle may be rolled up the feature into the storage device.

The present invention together with the above and other advantages may best be understood from the following detailed description of the embodiments of the invention, and as illustrated in the drawings.

BRIEF DESCRIPTION OF THE FIGURES

FIGS. 1, 1a and 1b illustrate a side view, a front view and a top view of an embodiment of a storage device in some embodiments of the present invention;

FIG. 2 illustrates an exploded view of a storage device in some embodiments of the present invention;

FIGS. 2a and 2b illustrate a closure and securing feature;

DETAILED DESCRIPTION OF THE INVENTION

The detailed description set forth below is intended as a description of the presently exemplified devices, methods and materials provided in accordance with aspects of the present invention and is not intended to represent the only forms in which the present invention may be practiced or utilized. It is to be understood, however, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the exemplified methods, devices and materials are now described.

This invention relates to storage devices, particularly to storage devices for storing and protecting vehicles, and more particularly to storage devices for storing and protecting bicycles and/or motorcycles.

In one aspect of the present invention, a storage device may include an enclosure which may be sealed and/or closed off to the outside environment, and may further include a compact, at least partially nesting structure. In an exemplary embodiment, the nesting structure may include a plurality of segments that may form the enclosure, where some of the segments may nest into another to open the enclosure while maintaining the compact form-factor of the structure.

Figure 5:
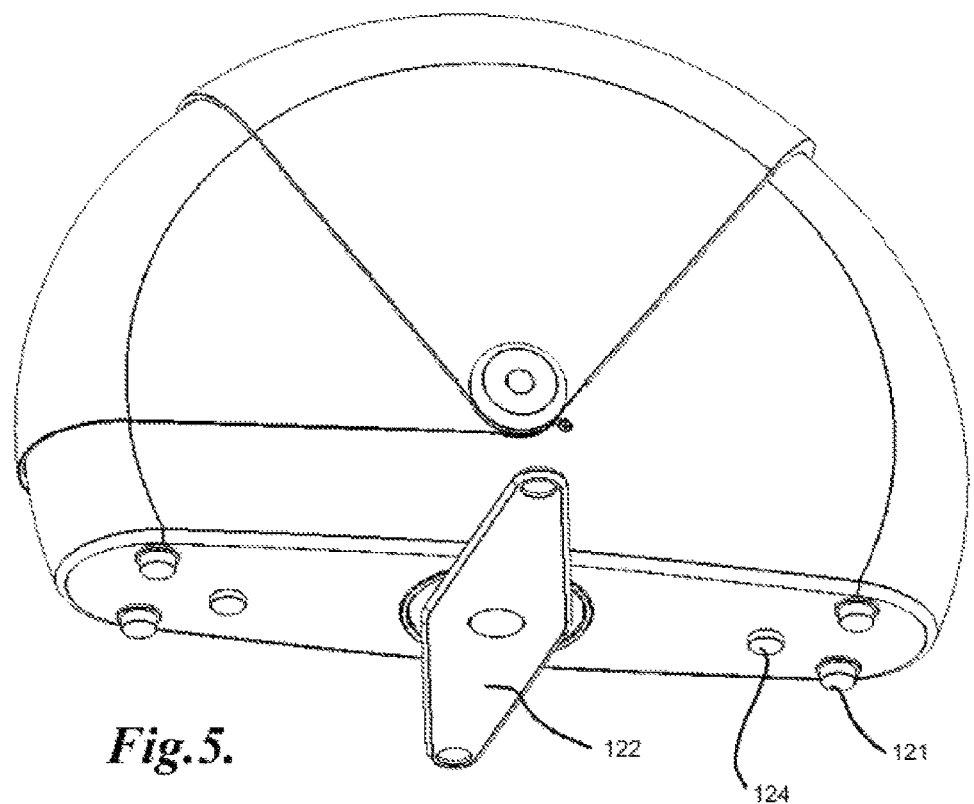
FIGS. 5 and 5a illustrate stabilizing features.
Figure 5A:
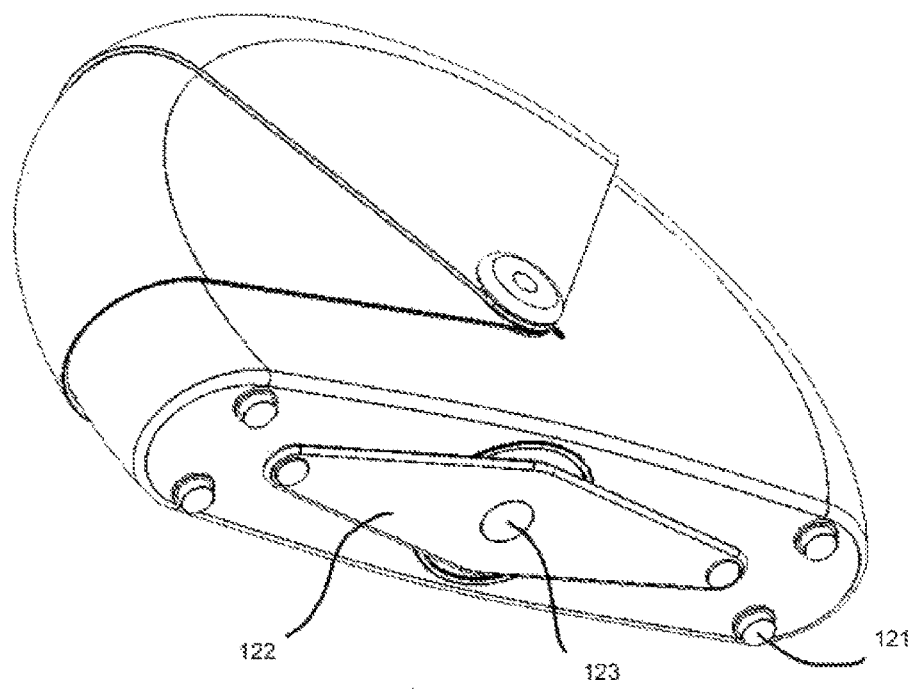

FIGS. 1, 1a and 1b illustrate an embodiment of a storage device 100 which may include a plurality of segments 104, 106, 108, 110 forming an enclosure with a base 120. In some embodiments, the nesting structure may generally have the form of a half circle or arch, where the flat portion of the structure may rest on the ground or other surface. The storage structure 100 may also include feet and/or stabilizers, such as illustrated with feet 121 and cross-stabilizer 122 in FIGS. 5 and 5a. The cross-stabilizer 122 may also be movable, such as rotating on pivot 123, such that it may be stored within the boundary of the storage device 100 and deployed for a stabilizing role, such as illustrated in FIGS. 5a and 5, respectively. The cross-stabilizer 122 may further interface with retention features to hold it place when not in use, such as with retention stubs 124.

In some exemplary embodiments, as illustrated, the segments 104, 106, 108, 110 may generally form a semi-circle or circular segment and which may pivot and/or rotate about a common pivot point 102. At least a portion of the segments 104, 106, 108, 110 may generally be linked to one another such that movement and/or articulation of one segment may affect movement and/or articulation of the others. For example, segments 108, 110 may be linked such that only two segments may need to be directly handled to effect opening and/or closing of the storage device 100, such as with segments 106 and 108 via handles at closure 112. In another example, such as illustrated in FIGS. 1d and 1e, only one segment may need to be directly handled to effect opening and/or closing of the storage device, as shown with storage device 100 with segments 106', 108', with segment 106' nesting within segment 108' when opening the storage device 100.

In some embodiments, the storage device 100 may also include a mechanism for opening and/or closing. For example, a crank and/or other mechanism may be employed to control and effect the opening and/or closing of the storage device 100. In some embodiments, the mechanism may be utilized to ensure proper articulation of the segments of the storage device 100 during opening and/or closing. FIG. 1f illustrates an example of a mechanism 150 for articulating the segments of the storage device 100. In general, the mechanism 150 may cause articulation of all of the segments that are movable regardless of which segment is handled and/or moved by a user. For example, a coupling mechanism may be utilized where the rotation of one segment about the pivot 102 may cause rotation of another segment about the pivot. FIG. 1f illustrates a first gear 151 coupled to a first segment 108' and a second gear 152 coupled to a second segment 106'. The first and second gears 151, 152 may further be coupled together by transmission gears 153, 154 which may alter the gear ratio between the first and second gears 151, 152. This may be desirable such that each segment rotates to a desired degree, for example, with segment 106' rotating 125 degrees and segment 108' rotating 70 degrees for the storage device 100 to be opened completely, as illustrated in FIGS. 1f and 1g, with a gear ratio of 1:1 for coupled gears 151, 153, where gear 153 and 154 rotate together, and a gear ratio of 12.5:7 for gears 154, 152. Other ratios and degrees of rotation may also be utilized depending on the shape of the segments and degree of opening of the storage device 100. The gears 151, 152 may be directly coupled to the segments 108', 106', for example, or they may be coupled in other manners, such as with gear 152 being coupled to segment 106' via a crank arm 155, as illustrated in FIG. 1f.

The components of the storage device 100, such as segments 104, 106, 108, 110, 106', 108' may be formed as completely independent elements, as illustrated in the exploded view of FIG. 2 and FIG. 2c.

The storage device may generally be constructed from any appropriate material, but may generally include rigid and/or durable materials to provide integrity and protection to the contents. Appropriate materials may include, but are not limited to, metals and alloys, composite materials, polymeric materials, naturally-derived materials such as wood, and/or any other appropriate material or combination thereof. The structure of the storage device may also include, for example, structural reinforcements or supports. These may be desirable to, for example, increase rigidity, increase durability and/or strength, provide guides or tracks for moving components, and/or other benefits.

FIG. 1 illustrates a storage device 100 with reinforcements, as illustrated with reinforcing ribs 103, 105, which may be present on the outer surface of the storage device 100, as illustrated on the outside of the segments 104, 106, 108, 110, or they may also be internal to the enclosure on the inner surface of the segments. They may also be present on a portion of the segments rather than all of them. The corresponding reinforcing ribs 103, 105 on the segments 104, 106, 108, 110 may also generally fit into corresponding depressions or tracks on the segments such that the reinforcing ribs 103, 105 may serve as guide tracks for the segments during movement or articulation to, for example, aid in maintaining the alignment of the segments. Reinforcing ribs and/or other reinforcements may also be present on the interior of the storage device 100, as illustrated in FIG. 1h.

Figure 1C:
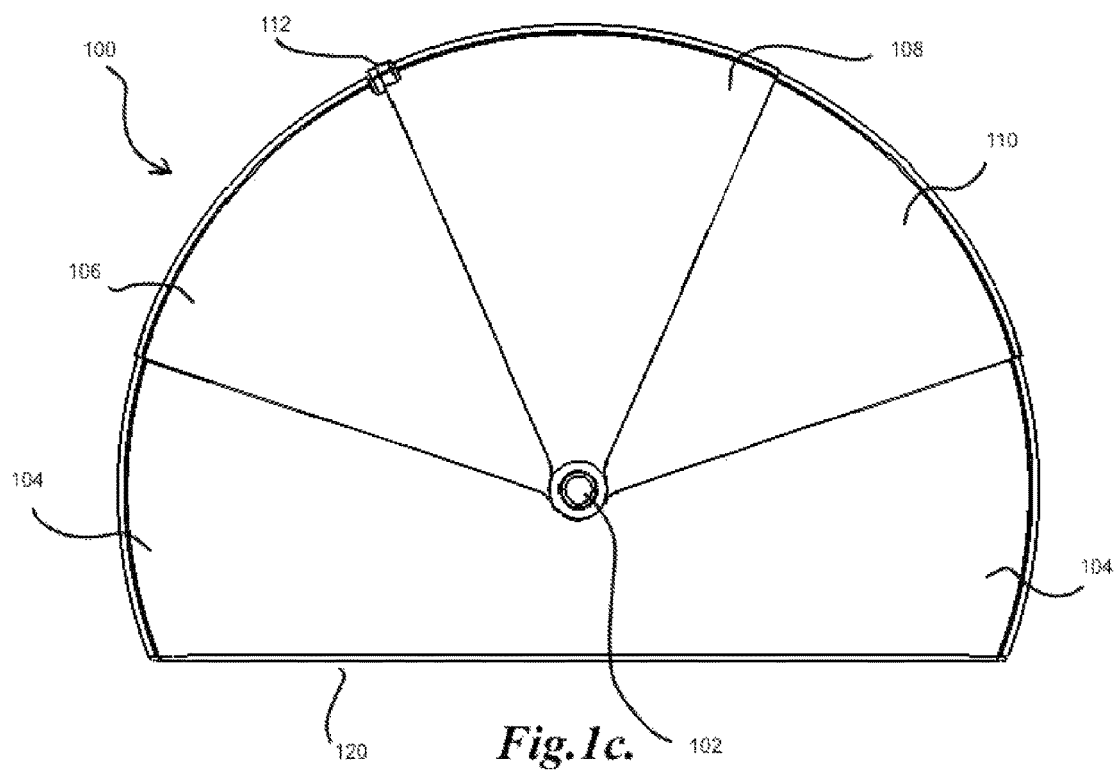
FIG. 1c illustrates a side view of an embodiment of a storage device without reinforcing ribs in some embodiments of the present invention.
Figure 1D:
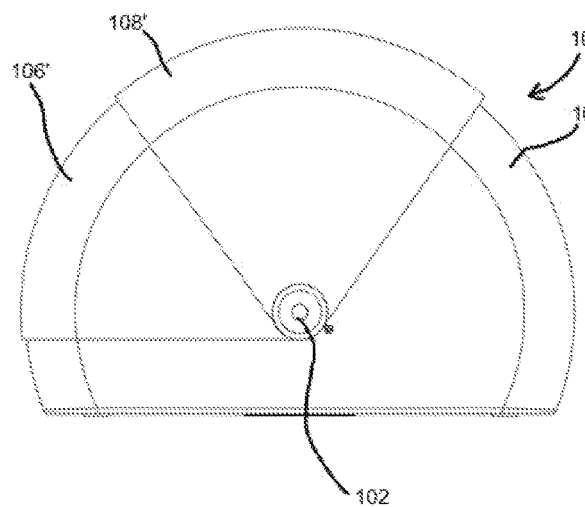
FIGS. 1d and 1e illustrate side views of an embodiment of a storage device with unidirectional moving segments.
Figure 1E:
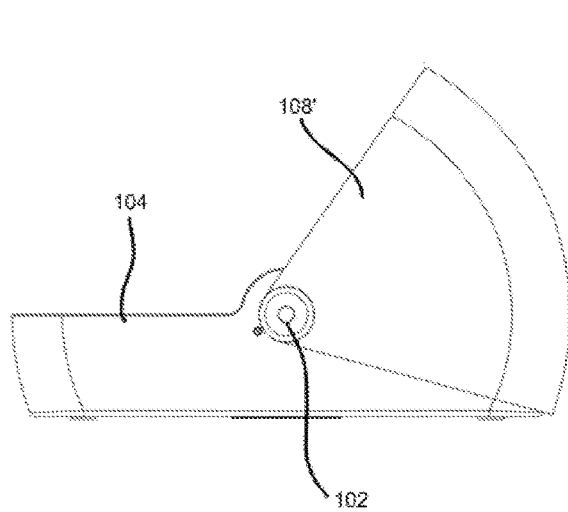
Figure 1F:
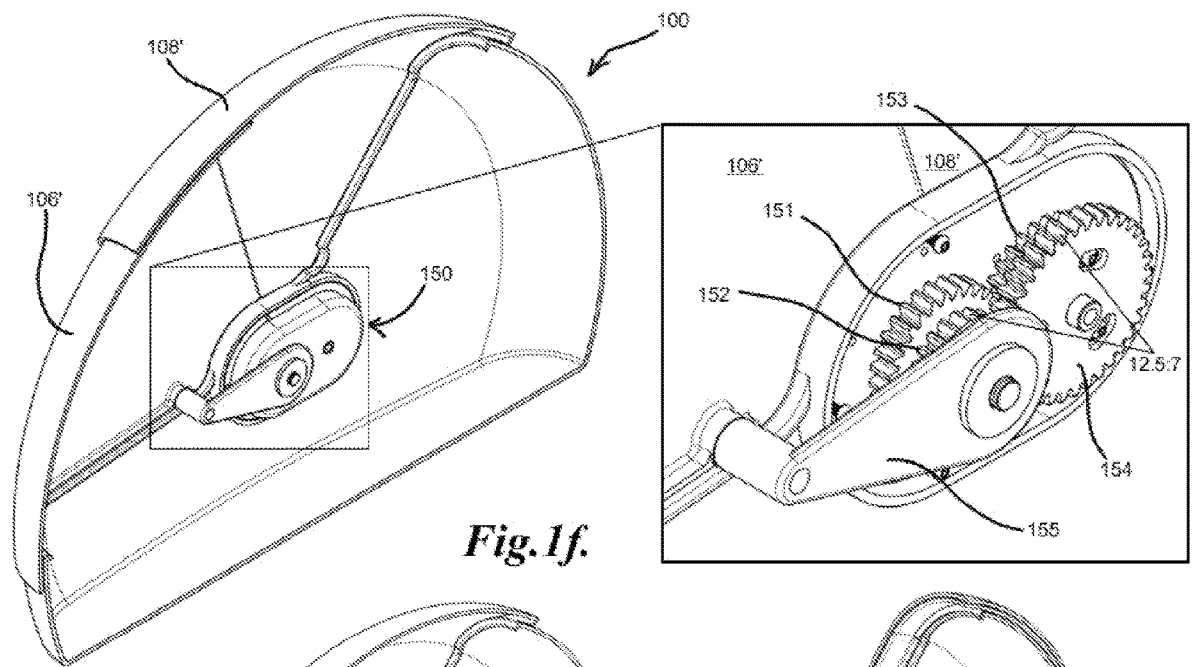
FIGS. 1f and 1g illustrate an opening and closing control mechanism.
Figure 1G:
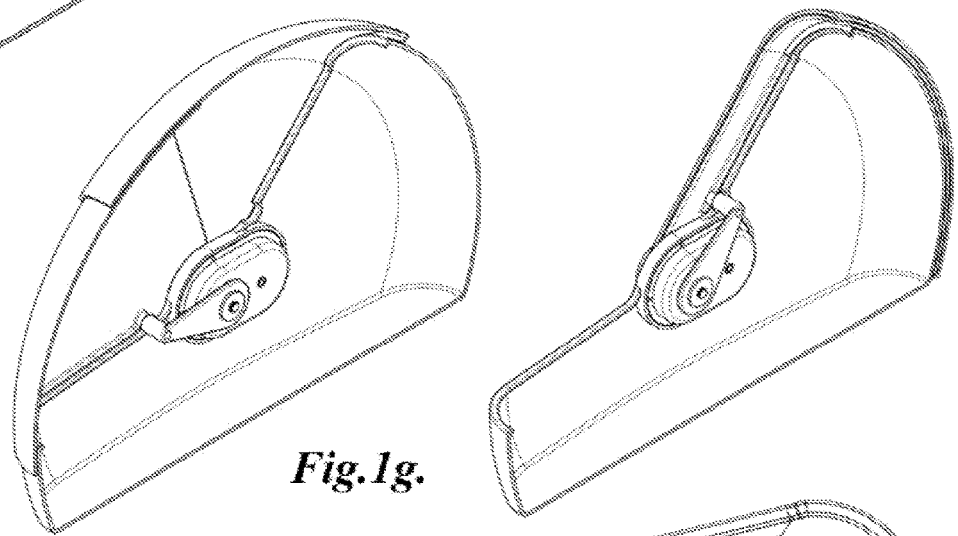
Figure 1H:
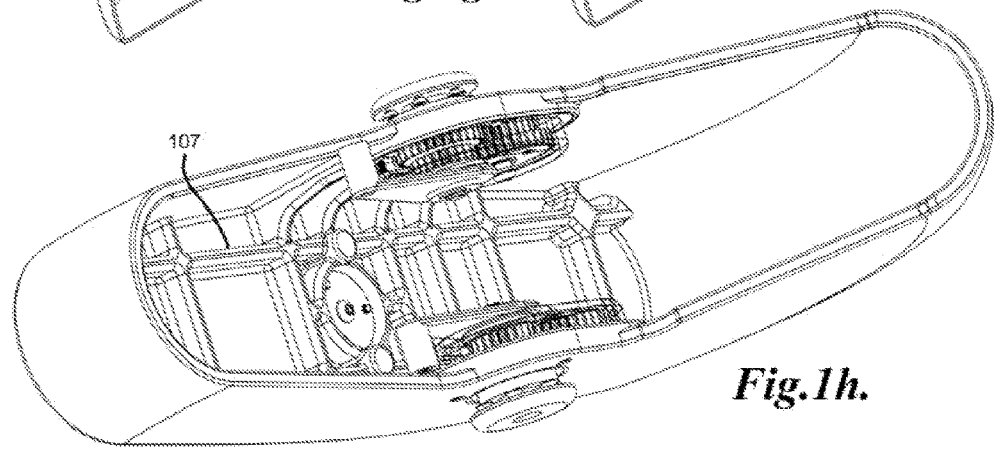
FIG. 1h illustrates reinforcing ribs on the interior of a storage device.

The storage device 100 may also not include reinforcements, such as illustrated in FIG. 1c with storage device 100 without reinforcing ribs. This may, for example, simplify construction and/or create a different aesthetic appearance for the storage device 100 and, depending on, for example, the material used for construction, reinforcements may not be especially necessary.

Figure 3:
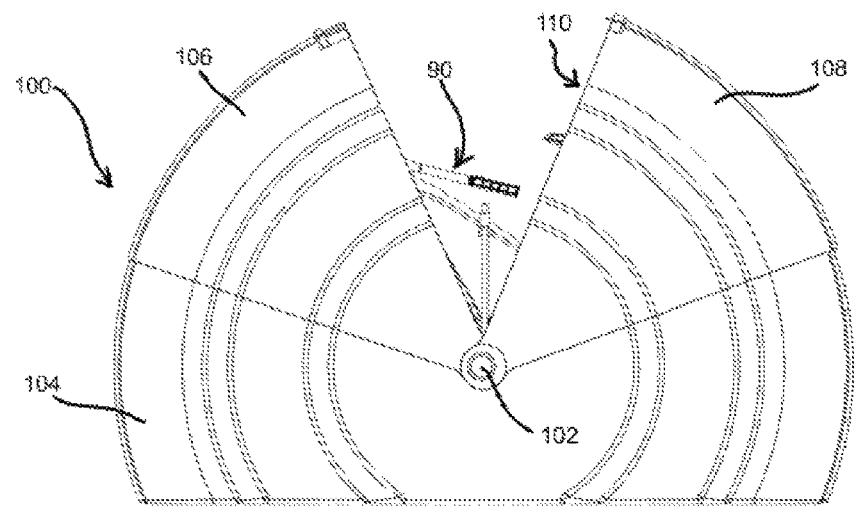
FIGS. 3, 3a and 3b illustrate the stages of opening of a storage device in some embodiments of the present invention.
Figure 3A:
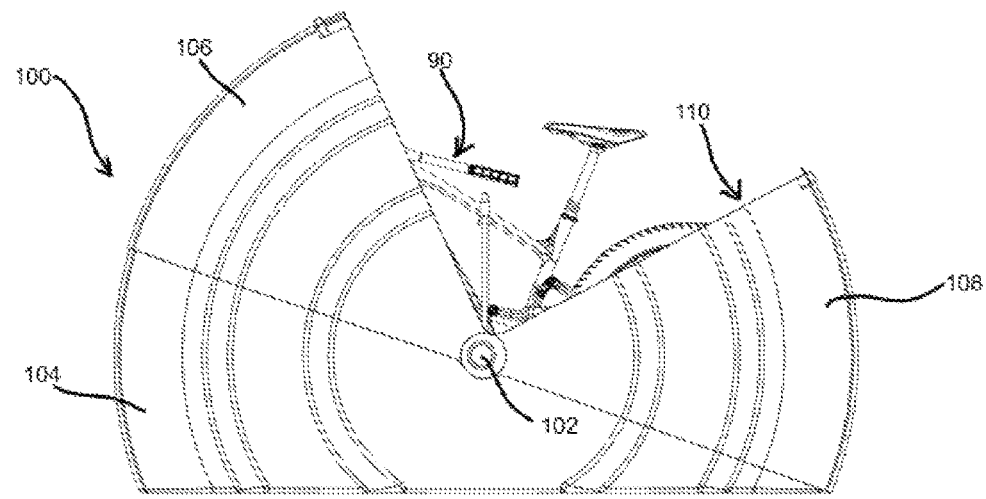
Figure 3B:
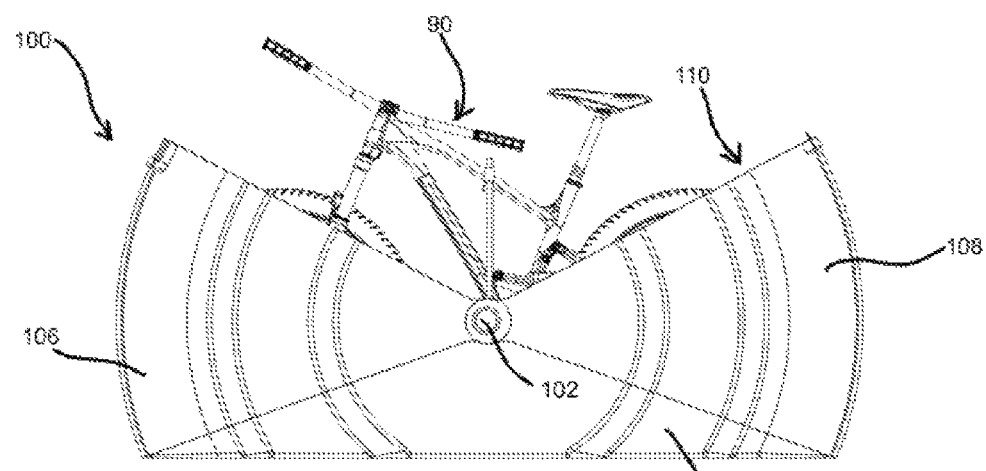

In some embodiments, the nesting structure may include a plurality of segments which may rotate and/or pivot on a central common axis or pivot point. In general, some of the segments may be sized such that they may nest into at least one other segment when they are rotated and/or pivoted about the common axis or pivot point. FIGS. 3, 3a and 3b illustrate the storage device 100 with a wheeled vehicle inside, as shown with a mountain bicycle 90, with nesting segments in phases of opening from partially open in FIG. 3, more open in FIG. 3a and fully open in FIG. 3b, where segment 110 fits into segment 108, and segments 106, 108, 110 fit over segment 104, as shown with segment 110 nesting into segment 108 in FIG. 3, segments 108, 110 nesting and fitting over segment 104 in FIG. 3a, and segments 106, 108, 110 fitting over segment 104. In general, the segments which meet to close the storage device 100 may have the same size and/or dimensions such that they mate to form a matching seal, such as with segments 106, 108 being the same size.

The segments may further include stops and/or other features for controlling the extent of movement and/or articulation of the segments to, for example, prevent the segments from moving beyond their intended positioning. FIG. 2 illustrates stops 104a, 104b on segment 104 for preventing segments 106 and 110 from extending past them, respectively.

In exemplary embodiments, a locking and/or secure closure may also be included for security of the contents of the storage device, as well as, for example, aiding in closing off the interior of the storage device from the outside. FIGS. 2, 2a and 2b illustrate a closure 112 with securing features, such as the snap-ins 112a which snap into corresponding apertures in the handle portion 112b of the closure. Other securing features may also be employed, such as, for example, magnetic elements, latches, buckles, and/or any other appropriate form of securing feature. Additional features for securing, such as those accommodating a lock or other security feature, may also be included.

In another aspect of the present invention, a storage device may further include wheel holders and/or other features for retaining a wheeled vehicle, such as, for example, a road bicycle, a mountain bicycle, a triathlon/time trial bicycle, a motorcycle, a recumbent bicycle, a hybrid bicycle and/or any other common wheeled vehicle, in a desired orientation and position within the storage device. For example, wheel tracks or holders, frame holders, bumpers, cushioning and/or any other appropriate feature or combination thereof may be utilized to hold a wheeled vehicle within the storage device. In general, it may be desirable to employ adjustable and/or flexible features to accommodate a variety of different vehicles, sizes or variations.

Figure 4:
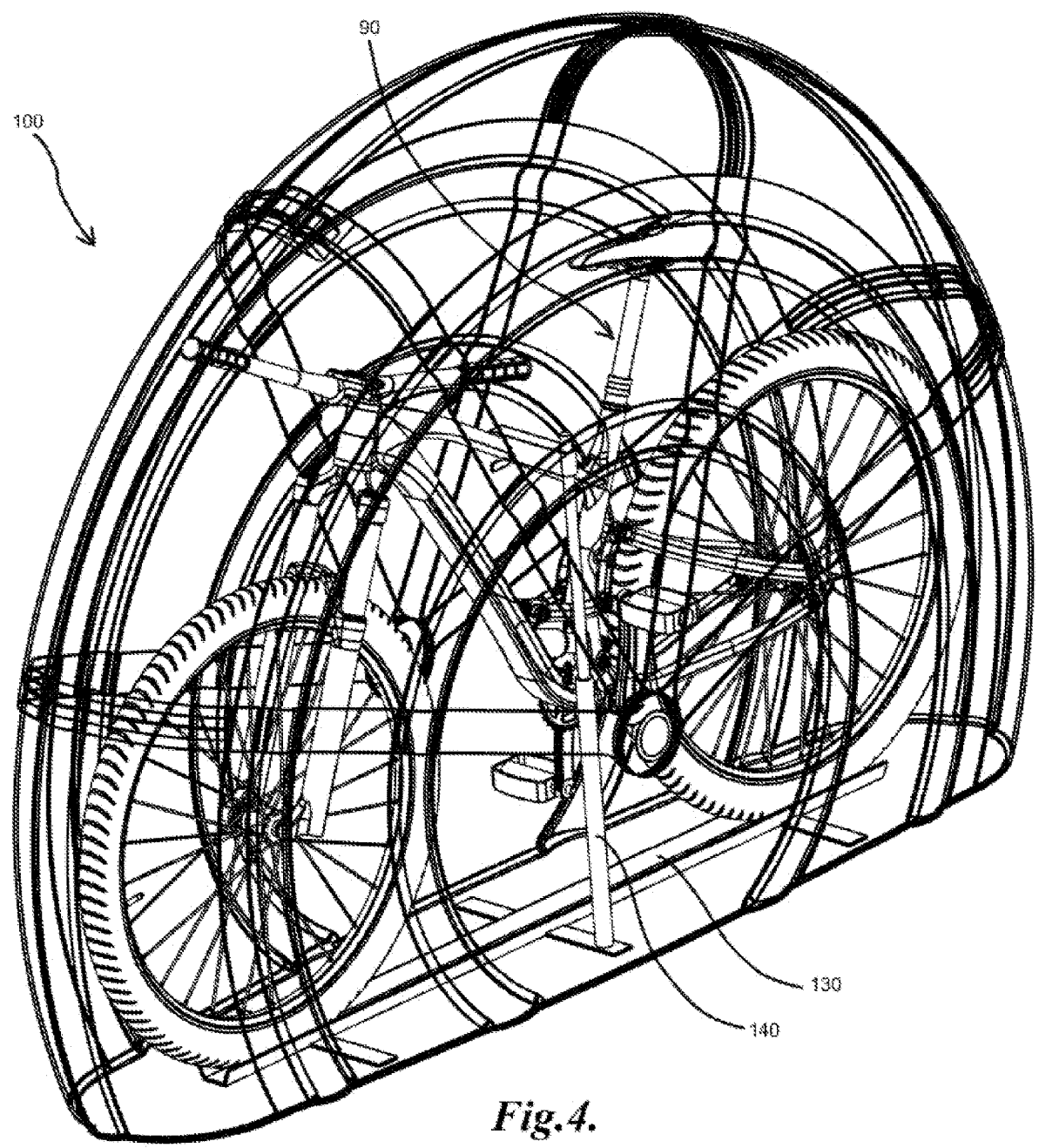
FIG. 4 illustrates a see-through view of a storage device with a bicycle enclosed and held with a wheel track and frame holder.

FIG. 4 illustrates a see-through view of the storage device 100 with wheel and frame holders, illustrated with wheel track 130 and frame holder 140 for retaining the bicycle 90.

In a further aspect of the present invention, a storage device may also include features for aiding or assisting a user in inserting and/or removing a wheeled vehicle from the storage device. In some embodiments, the storage device may include an aperture or opening at ground level such that a wheeled vehicle may be rolled into and/or out of the storage device without lifting. In some other embodiments, the storage device may include an assist feature, such as a ramp, incline, ledge or other graduating feature such that a wheeled vehicle may be rolled up the feature into the storage device.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. The disclosures of all patents, patent applications and publications cited herein are hereby incorporated herein by reference in their entireties, to the extent that they are consistent with the present disclosure set forth herein.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, wellknown structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein, the meaning of "in" includes "in" and "on" unless the context clearly dictates otherwise.

The invention claimed is:

1. A bicycle storage device, comprising:
a base;
a plurality of segments supported by the base;
the base and the segments forming a partially circular enclosure removably housing a bicycle comprising a frame and a pair of wheels;
a common pivot point about which a portion of the segments selectively pivot to nest inside each other to selectively open the enclosure;
a wheel track supported by the base removably supporting the wheels of the bicycle in an upright position above the base;
a frame holder supported by the base removably supporting the frame of the bicycle in the upright position above the base; and
wherein the plurality of segments further comprises two or three selectively pivoting segments and two non-pivoting segments.

2. The bicycle storage device of claim 1, further comprising an opening level with the base for rolling the bicycle into the storage device.

3. The bicycle storage device of claim 1, further comprising a graduating feature for rolling the bicycle into the storage device.

4. The bicycle storage device of claim 1, wherein the partially circular enclosure subtends an arc greater than 180 degrees.

5. The bicycle storage device of claim 1, further comprising a plurality of feet extending from a bottom side of the base.

6. The bicycle storage device of claim 1, wherein the base is elongated in a length dimension, further comprising a cross-stabilizer extending from a bottom side of the base elongated in a width dimension transverse to the length dimension of the base.

7. The bicycle storage device of claim 1 wherein:
the base is elongated in a length dimension, further comprising a cross-stabilizer extending from a bottom side of the base elongated in a width dimension;
the cross-stabilizer selectively pivots with respect to the base to selectively orient the width dimension of the cross-stabilizer transverse to the length dimension of the base, or to selectively align the width dimension of the cross-stabilizer with the length dimension of the base.

8. The bicycle storage device of claim 1, further comprising a lock to selectively prevent the segments from pivoting.

9. A storage device configured for removably housing a bicycle, comprising:
a base:
a plurality of segments supported by the base;
the base and the segments forming a partially circular enclosure configured for removably housing a bicycle comprising a frame and a pair of wheels;
a common pivot point about which a portion of the segments selectively pivot to nest inside each other to selectively open the enclosure;
a wheel track supported by the base configured for removably supporting the wheels of the bicycle in an upright position above the base;
a frame holder supported by the base configured for removably supporting the frame of the bicycle in the upright position above the base; and
wherein the plurality of segments further comprises two or three selectively pivoting segments and two non-pivoting segments.

10. The bicycle storage device of claim 9, further comprising an opening level with the base configured for rolling the bicycle into the storage device.

11. The bicycle storage device of claim 9, further comprising a graduating feature configured for rolling the bicycle into the storage device.

12. The bicycle storage device of claim 9, wherein the partially circular enclosure subtends an arc greater than 180 degrees.

13. The bicycle storage device of claim 9, further comprising a plurality of feet extending from a bottom side of the base.

14. The bicycle storage device of claim 9, wherein the base is elongated in a length dimension, further comprising a cross-stabilizer extending from a bottom side of the base elongated in a width dimension transverse to the length dimension of the base.

15. The bicycle storage device of claim 9 wherein:
the base is elongated in a length dimension, further comprising a cross-stabilizer extending from a bottom side of the base elongated in a width dimension;
the cross-stabilizer selectively pivots with respect to the base to selectively orient the width dimension of the cross-stabilizer transverse to the length dimension of the base, or to selectively align the width dimension of the cross-stabilizer with the length dimension of the base.

16. The bicycle storage device of claim 9, further comprising a lock to selectively prevent the segments from pivoting.

* * * * *